(12) United States Patent
Burritt et al.

(10) Patent No.: US 8,218,532 B1
(45) Date of Patent: Jul. 10, 2012

(54) ARRANGEMENT FOR DYNAMICALLY DIVERTING COMMUNICATIONS HAVING CHARACTERISTICS INCOMPATIBLE WITH A COMMUNICATION DEVICE TO ANOTHER DEVICE

(75) Inventors: David Burritt, Broomfield, CO (US); Gwilym Evans, Thornton, CO (US); Brian Freeman, Westminster, CO (US); Paul Roller Michaelis, Louisville, CO (US); Vivekanada Velamala, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 327 days.

(21) Appl. No.: 11/956,779

(22) Filed: Dec. 14, 2007

(51) Int. Cl.
*H04L 12/66* (2006.01)
*H04M 11/00* (2006.01)

(52) U.S. Cl. .......................... 370/352; 379/52
(58) Field of Classification Search .............. 370/352; 379/52
See application file for complete search history.

(56) References Cited

U.S. PATENT DOCUMENTS

| | | | |
|---|---|---|---|
| 5,673,205 | A | 9/1997 | Brunson |
| 5,781,614 | A | 7/1998 | Brunson |
| 7,174,004 | B1* | 2/2007 | Michaelis ............. 379/52 |
| 7,386,100 | B2* | 6/2008 | Michaelis ............. 379/52 |
| 7,545,761 | B1* | 6/2009 | Kalbag ............. 370/310 |
| 7,978,827 | B1* | 7/2011 | Becker et al. ............. 379/52 |
| 2004/0196961 | A1* | 10/2004 | Freundlich et al. ............. 379/52 |
| 2004/0228325 | A1* | 11/2004 | Hepworth et al. ............. 370/352 |
| 2006/0007916 | A1* | 1/2006 | Jones et al. ............. 370/352 |
| 2006/0171510 | A1* | 8/2006 | Mundra et al. ............. 379/52 |

FOREIGN PATENT DOCUMENTS

| | | |
|---|---|---|
| EP | 1 761 078 A2 | 3/2007 |
| JP | 2000-224333 | 8/2000 |
| JP | 2002-274054 | 9/2002 |
| WO | 2007/062418 A2 | 5/2007 |

OTHER PUBLICATIONS

Michaelis, Paul Roller, et al., U.S. Appl. No. 11/732,350, filed Apr. 3, 2007, entitled "Alternatively Enabling and Disabling the Talk Paths of Endpoints That Share a Virtual Address".
Schulzrinne, et al., RFC-2833 Protocol, entitled "RTP Payload for DTMF Digits, Telephony Tones and Telephony Signals," Network Working Group, http://www.ietf.org/rfc/rfc2833.txt, Jan. 13, 2010, 27 pages.
Hellstrom, et al., RFC-4103 Protocol, entitled "RTP Payload for Text Conversation," Network Working Group, http://www.rfc-editor/org/rfc/rfc4103.txt, Jan. 13, 2010, 18 Pages.

* cited by examiner

*Primary Examiner* — Ricky Ngo
*Assistant Examiner* — Paul H Masur

(57) ABSTRACT

A monitoring device monitors headers of packets on a communications session with a primary communications device, and when it detects packets of a medium that is incompatible with the primary device, it causes those packets to be diverted to a secondary device that is associated with the primary device and that is compatible with that medium. During set-up of the communications session, the monitoring device replaces or supplements the handshake of the primary device, thereby providing to the network a single handshake that identifies the media supported by the combination of the primary and secondary devices.

23 Claims, 2 Drawing Sheets

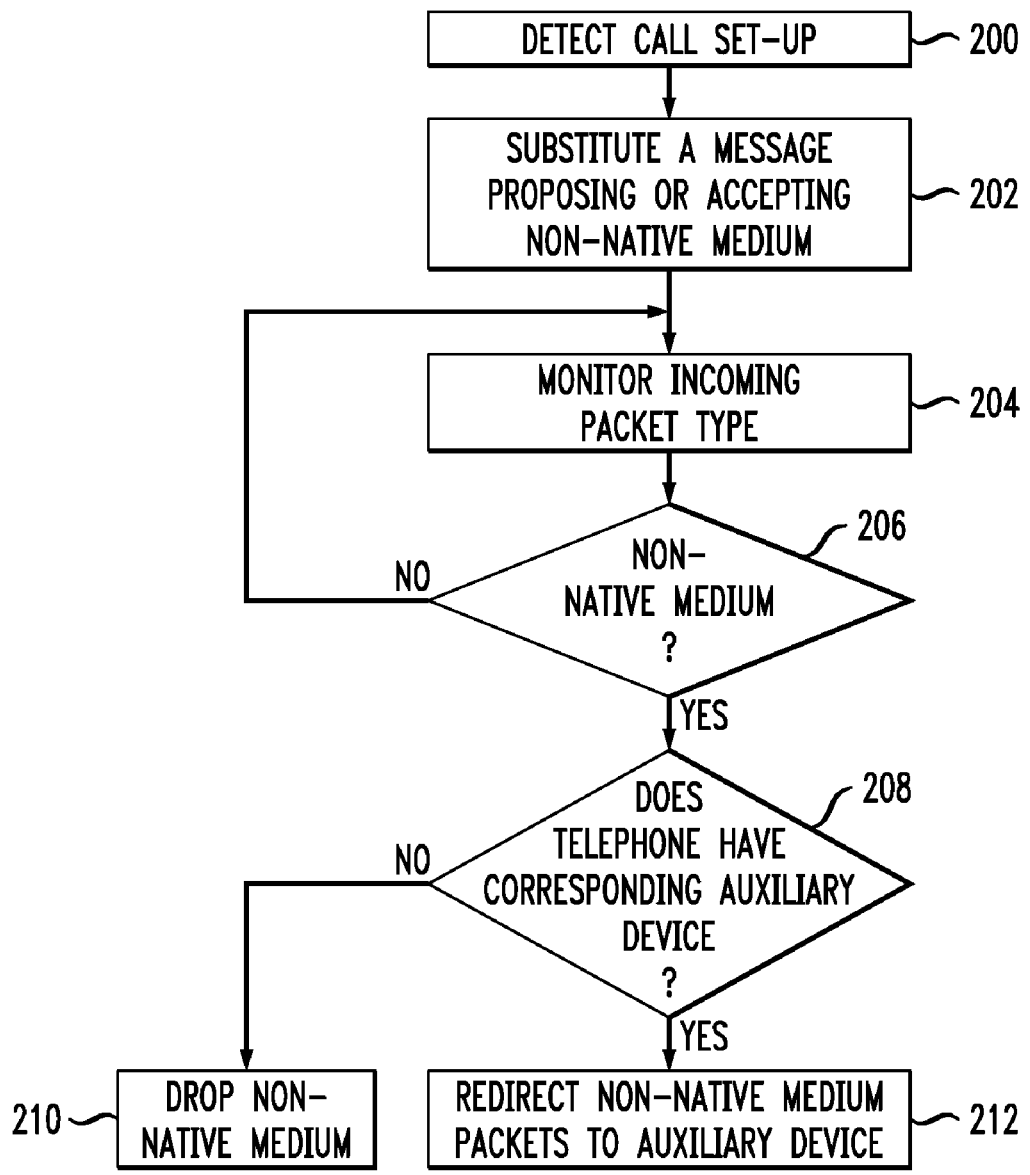

ARRANGEMENT FOR DYNAMICALLY DIVERTING COMMUNICATIONS HAVING CHARACTERISTICS INCOMPATIBLE WITH A COMMUNICATION DEVICE TO ANOTHER DEVICE

TECHNICAL FIELD

This invention is directed generally to communications, and illustratively to communications in different multiple media.

BACKGROUND OF THE INVENTION

People who are hearing-impaired or unable to speak communicate via the telephone network by using specialized text terminals, commonly referred to as a telecommunication device for the deaf (TDD) or a teletypewriter (TTY). A TTY converts symbols (letters, numbers, punctuation, etc.) typed on its keyboard into audio signals that it transmits through the telephone network to another TTY. The receiving TTY converts the audio signals back into symbols and displays them on its display screen. A call between TTYs is established and terminated in the same manner as between telephones: either the TTY emulates the call signaling of a telephone, or the TTY user uses a standard telephone to initiate, dial, answer, and terminate the call, and uses the TTY only for the traffic-exchange portion of the call. The TTY usually connects to the same analog RJ-11 line as the telephone via an RJ-11 splitter.

In a Voice over Internet Protocol (VoIP) network, a SIP (Session Initiation Protocol) network, or an H.323 network, IP endpoints negotiate communication call-path parameters between themselves as part of the call set-up process prior to establishing the communication path. This is necessary in packet systems because, unlike analog telephones on the public network, IP endpoints can generate many different types of specialized packets that vary depending on the media type. Examples include voice packets, text packets, and video packets. As a part of the call set-up process, endpoints specify the types of packets that will be supported during the call. For calls between an analog endpoint on the public network and an IP endpoint, a similar call set-up negotiation occurs between the IP endpoint and the associated IP/analog gateway.

Looking now at the issue of text transmissions, analog text terminals such as TTYs do not emit a self-identifying handshake tone or rely on a carrier tone. (In this sense, they are different from computer modems and fax machines.) The devices are silent when not transmitting text. A complicating factor when attempting to use these devices in conjunction with IP networks is that, when the user is typing a message, the audio tones emitted by these devices are often not transmitted reliably by the voice-optimized audio channels of IP systems. Packet loss and audio comprehension levels commonly seen in IP networks can distort the TTY signals so badly that they cannot be decoded. For this reason, it is often necessary to transmit text via specialized non-audio mechanisms, such as the RFC-2833 protocol ("RTP Payload for DTMF Digits, Telephone Tones and Telephony Signals") or the RFC-4103 protocol "RTP Payload for Text Conversation").

The RFC-2833 approach transports text via IP by sending what are, in essence, verbal descriptions of the corresponding analog Baudot TTY tones. The RFC-4103 approach transports T.140-encoded text as a real-time media stream in parallel with the voice stream. Although both RFC-2833 and RFC-4103 have been demonstrated to provide reliable transport of text on IP networks, a problem remains:

Because analog TTY devices are not self-identifying, if a call is placed by a TTY user on the analog public network to the user of an IP telephone, the call set-up negotiation between the IP endpoint and the associated IP/analog gateway is likely to assume erroneously that a non-text voice-only media stream and a non-text voice-only IP endpoint will be satisfactory. The result will be, that the user of the IP endpoint will not know that he or she has received a call from a TTY user (because distorted TTY tones will be audible on the handset), but will be unable to respond because the IP endpoint is unable to receive or transmit text packets.

At least three techniques exist for providing TTY-type functionality on IP endpoints. One manufacturer has demonstrated a telephone that allows a keyboard to be connected thereto via a USB port; the keyboard is used to transmit text, and the phone's display is used to display incoming text. Others have demonstrated a soft TTY—essentially a soft phone that emulates a TTY. A third manufacturer's phone, while having no inherent text capability, allows users in telecommuter mode to set-up and control calls for which the endpoint is a traditional analog TTY device. The first and last configurations are regarded by customers as expensive and clumsy because they require additional hardware. And the chief limitation of the second configurations is that it is not supported on physical telephones.

The preceding discussion illustrates a general problem in networks: during call set-up, they negotiate (e.g., via SIP) the capabilities that the call endpoints must have in order to engage in the call. These capabilities include the medium or media that the endpoints must be able to communicate in, such as audio, text, or video. If one of the endpoints should deviate from the negotiated capabilities—by introducing a new medium into the call, for example—the other endpoint may not have the corresponding capability and thus may not be able to communicate via the call.

SUMMARY OF THE INVENTION

This invention is directed to solving these and other problems and disadvantages of the prior art. According to one aspect of the invention, a communications session, established with a first communication device of at least two communication devices that are associated with each other, for communications having a first characteristics—for example, communications in a first medium that is compatible with the first device—is monitored, and when a communication having a second characteristic different from the first characteristic—for example, a communication in a second medium that is incompatible with the first device, but is compatible with the second device of the two or more devices—is detected, the communication having the second characteristic is diverted to the second device. Consequently, communications having the first characteristic are rendered—presented to a user in a user-perceivable form—on the first device, and communications having the second characteristic are rendered to the user on the second device. The invention thus advantageously allows communications characteristics to be changed dynamically in an existing communications session with a communications device, even though the communications session may not be set up for communications having the changed characteristics and even though the changed characteristics are incompatible with the communications device.

The invention may illustratively take the form of a method, an apparatus that performs the method, or a computer-readable medium containing instructions that cause the computer to perform the method.

BRIEF DESCRIPTION OF THE DRAWING

These and other features and advantages of the invention will become more apparent from considering the following description of an illustrative embodiment of the invention together with the drawing, in which:

FIG. 2 is a functional-flow diagram of operation of the system of FIG. 1 implementing the illustrative embodiment of the invention.

DETAILED DESCRIPTION

Figure 1:
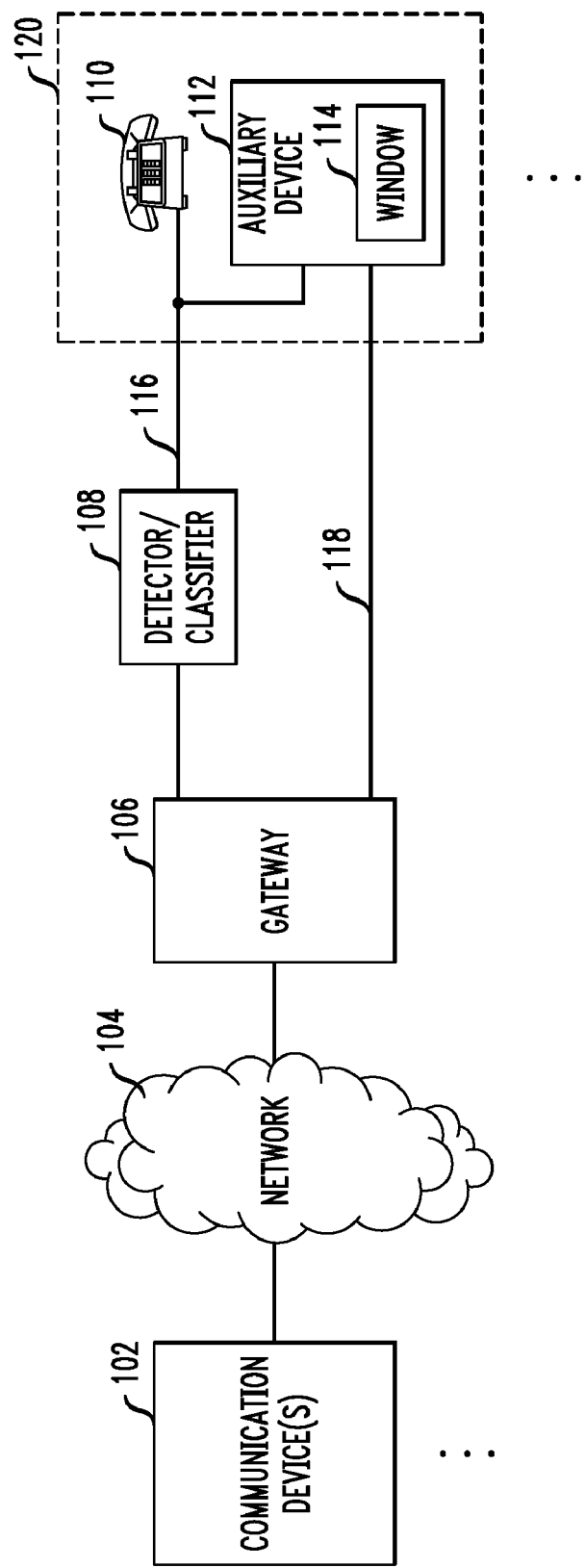
FIG. 1 is a block diagram of a communications system that includes an illustrative embodiment of the invention.

FIG. 1 shows an illustrative communications system comprising one or more communications devices 102 interconnected by a network 104 through a routing entity such as a gateway 106 with one or more communications devices such as VoIP telephones 110, in a conventional manner. Communications devices 102 may be any desired devices, such as conventional analog or digital telephones, VoIP telephones, softphone-equipped personal computers, personal digital assistants, etc. At least one device 102 is able to communicate in multiple media or comprises a plurality of devices that are together capable of communicating in multiple media, such as voice, text, and/or video. For example, a device 102 may comprise a telephone and an associated TTY device. Network 104 is any desired network, such as a time-division multiplexed network like the conventional telephone network, a packet network such as the Internet or a local area network, a wireless network, etc. Gateway 106 is a conventional gateway that connects network 104 to conventional VoIP telephones 110 in a conventional manner either directly or via an intermediary switch or server. As described so far, the system of FIG. 1 is conventional.

According to the invention, at least one VoIP telephone 110 has associated (120) therewith an auxiliary device 112 that is capable of rendering media that are not compatible with VoIP telephone 110. The compatible medium of VoIP telephone 110 is audio, and auxiliary device 112 is capable of rendering an incompatible medium or media, such as text and/or video. Auxiliary device 112 may be any desired device, such as a TTY, a personal computer, a personal digital assistant, etc. Auxiliary device 112 is capable of receiving and displaying a window 114 of information in the incompatible medium or media, such as text or images. Auxiliary device 112 is connected to gateway 106 either via the same communication link 116 as VoIP phone 110, or via a separate communication link 118. Associating auxiliary device 112 with VoIP telephone 110 is accomplished in a conventional manner, such as by administratively registering auxiliary device 112 as an adjunct to VoIP telephone on gateway 106. For example, a single user may be associated with a plurality of client devices 110 and 112 through a SIP address of record (AOR) that provides a unifying identifier which is mapped across the multiple client devices. Accordingly, the sending client device may dial the user's AOR and gateway 106 or a server may be employed to determine to which client device the call should be routed.

Also according to the invention, an enhanced detector/classifier 108 is interposed between gateway 106 and devices 110 and 112. In one embodiment, detector/classifier 108 is a separate device from gateway 106 that is located on link 116 between gateway 106 and VoIP telephone 110. In another embodiment, detector/classifier 108 may be incorporated into gateway 106. Detector/classifier 108 acts as a "packet sniffer", monitoring the headers of packets being carried by communications link 116 to, and optionally also from, VoIP telephone 110 and detecting therefrom the packets' types. The enhancement of detector/classifier 108 resides in the fact that detector/classifier 108 preferably participates in the communication session set-up process between telephone 110 and gateway 106 or device 102.

The operation of gateway 106 and detector/classifier 108 that is relevant to this invention is shown in FIG. 2. As a part of setting up a call, communications device 102 or gateway 106 and VoIP telephone 110 would normally negotiate a communications session between them in a medium that is compatible with VoIP telephone 110, namely audio. For example, if telephone 110 uses the Session Initiation Protocol (SIP), the SIP call-initiating entity 102, 106, or 110 sends an "INVITE" message specifying the medium in which it wants to conduct the communications, and the SIP call-terminating entity 102, 106, or 110 responds with a "200 OK" message specifying the medium in which it can conduct the communications. Detector/classifier 108 monitors link 116, and when it detects call set-up being performed, at step 200, it assumes responsibility for the set-up handshake of telephone 110: it substitutes for the "INVITE" or "200 OK" message sent by telephone 110 a corresponding message that specifies not only the compatible medium of telephone 110 but also the medium or media that can be handled by auxiliary device 112, at step 202. For example, telephone 110 would say only "I can do G.711 and G.729 audio." That message is blocked, and the actual call set-up handshake from detector/classifier 108 is something like, "I can do G.711 audio, G.729 audio, and RFC-2833 text." This is important because, in many systems, the transmitting device will refuse to send packets that the receiving station does not indicate that it can accommodate. In systems where the transmitting device does not refuse to send packets that the receiving station cannot accommodate, the enhancement of detector/classifier 108 is not needed.

When the communications session is established, detector/classifier 108 begins to monitor the headers of packets moving across link 116 to VoIP telephone 110 for the packet type, at step 204. As long as device 102 and VoIP telephone 110 are engaging only in audio communications, detector/classifier 108 does not detect, at step 206, an incompatible medium type of packets on link 116, so it continues to monitor the packet type at step 204.

Now let us assume that device 102 begins to communicate on the established communication session in a medium other than audio—in TTY tones, text, or video, for example. Gateway 106 detects this new medium in the communication and sends the medium across link 116 in packets of non-audio type. For example, gateway 106 converts TTY tones into text, in a conventional manner, and communicates the text in text packets on link 116. Gateway 106 also communicates text from device 102 in text packets on link 116, and communicates video in video packets on link 116. But, as was mentioned before, VoIP telephone 110 is not capable of rendering text or video. Detector/classifier 108 therefore detects the non-audio type of the text or video packets, at step 206, and signals this detection to gateway 106. In an alternative embodiment, detector/classifier 108 also sends the text or video packets back to gateway 106 with a request to send them to auxiliary device 112.

In response to this signal, gateway 106 checks its records to determine whether VoIP telephone 110 has associated therewith an auxiliary device that is capable of rendering the detected type of non-native medium, at step 208. If not, gateway 106 ceases to transmit packets of the incompatible type on link 116 and merely drops the information of the incompatible type, at step 210. But if it finds that VoIP telephone 110 does have associated therewith an auxiliary device 112 that is capable of rendering the detected type of incompatible medium, gateway 106 determines how the auxiliary device 112 is connected to gateway 106 and then begins to transmit all packets of the incompatible medium type to auxiliary device 112 via that connection, at step 212, while continuing to transmit packets of the compatible medium type to VoIP telephone 110. For example, if auxiliary device 112 is connected to gateway 106 via the same physical link 116 as VoIP telephone 110, gateway 106 transmits the packets of the incompatible medium type on link 116 to a different address—the address of auxiliary device 112—as opposed to the address of VoIP telephone 110. If auxiliary device 112 is connected to gateway 106 via a separate physical link 118, gateway 106 transmits the packets of the incompatible medium on link 118 to auxiliary device 112, thereby bypassing detector/classifier 108.

In an alternative embodiment, the functionality described in the preceding paragraph may be performed by detector/classifier 108 instead of gateway 106. In this embodiment, detector/classifier 108 may be connected to auxiliary device 112 either via link 116 or via a separate physical link 118.

Auxiliary device 112 responds to receipt of the packets of the incompatible medium by rendering the medium on window 114. For example, it displays the received text or video in window 114. Consequently, the medium of communication between devices 102 and a user of VoIP telephone 110 and auxiliary device 112 may be changed dynamically, on the fly, during an established communication session, even though the new medium is not compatible with VoIP telephone 110.

Of course, various changes and modifications to the illustrative embodiment described above will be apparent to those skilled in the art. For example, the invention is not limited to assisting a VoIP telephone in rendering non-audio media, but may be used to assist any communication device in rendering incompatible media or providing any other incompatible communication capability. Instead of a different medium, the characteristic that is incompatible with the primary device may be a different encoding of the same medium. Or, communication entities that are in communication with each other do not have to negotiate any media characteristics during the initial communication setup. The type of media transmitted by a device or group of devices associated with a communication entity can be detected by the communication system and delivered to proper devices associated with the other entity with which the communication was initially set up. Furthermore, detector/classifier 108 may not be interposed into a communication session automatically, but only in response to a signal from telephone 110 or auxiliary device 112 that is generated by a user of telephone 110 or device 112 upon detecting an incompatible medium, e.g., a TTY tone. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   during set-up of a communications session with a first communication device that is able to communicate via communications having a first characteristic but is unable to communicate via communications having a second characteristic different from the first characteristic, substituting an indication of ability to communicate via communications having the first characteristic and via communications having the second characteristic for an indication by the first device of ability to communicate via communications having the first characteristic but not the second characteristic;
   monitoring the communications session established for communicating in a first medium with the first device;
   detecting in the communications session a communication directed to the first device and having the second characteristic; and
   in response to the detecting, diverting the communication directed to the first device and having the second characteristic from the first device to a second communication device that is associated with the first communication device and that is able to communicate via the communications having the second characteristic.

2. The method of claim 1 wherein:
   indicating comprises during set-up of the communications session, forbearing from negotiating at least the first characteristic for the communications session.

3. The method of claim 1 wherein:
   detecting in the communications session a communication having the second characteristic comprises
   detecting in the communications session a communication in a second medium different from the first medium; and
   diverting the communication having the second characteristic comprises
   diverting the communication in the second medium to the second device.

4. The method of claim 3 wherein:
   the first medium is compatible with the first device; and
   the second medium is incompatible with the first device and compatible with the second device.

5. The method of claim 3 wherein:
   monitoring communications session established for communicating in a first medium with the first device comprises
   monitoring the communications session for communications in the second medium.

6. The method of claim 1 further comprising:
   the first device engaging in the communications session in communications having the first characteristics;
   detecting in the communications session a communication having a second characteristic comprises
   during the engaging, detecting the communication having the second characteristic; and
   diverting the communication having the second characteristic comprises
   diverting the communication having the second characteristic while the first device continues to engage in the communications having the first characteristic.

7. The method of claim 1 wherein:
   diverting the communication having the second characteristic comprises
   monitoring packets carrying communications to the first device; and
   diverting packets carrying communications having the second characteristic.

8. The method of claim 7 wherein:
   monitoring packets carrying communications to the first device comprises
   monitoring headers of the packets for packet type, and
   sending packets of a type that carries communications of a first medium to the first device; and
   diverting packets carrying communications having the second characteristic comprises sending packets of a type that carries communications of a second medium different from the first medium to the second device instead of to the first device.

9. The method of claim 1 further comprising:
rendering the communications having the first characteristic on the first device; and
rendering the communications having the second characteristic on the second device.

10. A non-transitory computer-readable medium containing instructions which, when executed by a computer, cause the computer to perform the method of claim 1.

11. An apparatus comprising:
a device for substituting, during set-up of a communications session with a first communication device that is able to communicate via communications having a first characteristic but is unable to communicate via communications having a second characteristic different from the first characteristic, an indication of ability to communicate via communications having the first characteristic and via communications having the second characteristic for an indication by the first device of ability to communicate via communications having the first characteristic but not the second characteristic, for monitoring the communications session established for communicating in a first medium with the first device, for detecting in the communications session a communication directed to the first device and having the second characteristic, and for diverting, in response to the detecting, the communication directed to the first device and having the second characteristic from the first device to a second communication device that is associated with the first communication device and that is able to communicate via the communications having the second characteristic.

12. The apparatus of claim 11 wherein:
the first communication device is for forbearing negotiating at least the first characteristic for the communications session during set-up of the communications session.

13. The apparatus of claim 11 wherein:
the device for indicating, detecting, and diverting is for signaling detection of the communication having the second characteristic; and
the apparatus further comprises
a device responsive to the signaling for routing the communications having the second characteristic to the second device.

14. The apparatus of claim 13 wherein:
the routing device is for sending communications having the first characteristic to the first device via a first communication link, and for sending communications having the second characteristic to the second device via a second communications link different from the first communications link.

15. The apparatus of claim 13 wherein:
the routing device is for sending communications having the first characteristic to a first address of the first communication device, and for sending communications having the second characteristic to a second address of the second communication device different from the first address.

16. The apparatus of claim 11 wherein:
the communications having a first characteristic comprise communications in a first medium; and
the communications having a second characteristic comprise communications in a second medium different from the first medium.

17. The apparatus of claim 16 wherein:
the first medium comprises audio; and
the second medium comprises at least one of text and image.

18. The apparatus of claim 16 wherein:
the first medium is compatible with the first device; and
the second medium is incompatible with the first device and compatible with the second device.

19. The apparatus of claim 16 wherein:
the device for indicating, detecting, and diverting is for monitoring the communications session for communications in the second medium.

20. The apparatus of claim 11 wherein:
the device for indicating, detecting, and diverting is for monitoring the communications session while the first device is engaging in communications having the first characteristics, for detecting the communications having the second characteristic during the engaging, and for causing diversion of the communications having the second characteristic while the first device continues to engage in the communications having the first characteristic.

21. The apparatus of claim 11 wherein:
the device for indicating, detecting, and diverting is for monitoring packets carrying communications to the first device, and is for causing the diversion of packets carrying communications having the second characteristics.

22. The apparatus of claim 11 wherein:
the device for indicating, detecting, and diverting is for monitoring headers of packets carrying communications to the first device, for allowing packets of a type that carries communications of a first medium to the first device, and for causing packets of a type that carries communications of a second medium different than the first medium to be sent to the second device instead of the first device.

23. The apparatus of claim 11 wherein:
the device for indicating, detecting, and diverting comprises at least one of a packet sniffer and a call classifier.

* * * * *